Oct. 28, 1924.
J. DLESK, JR
1,513,375
BALL BEARING
Filed June 23, 1924
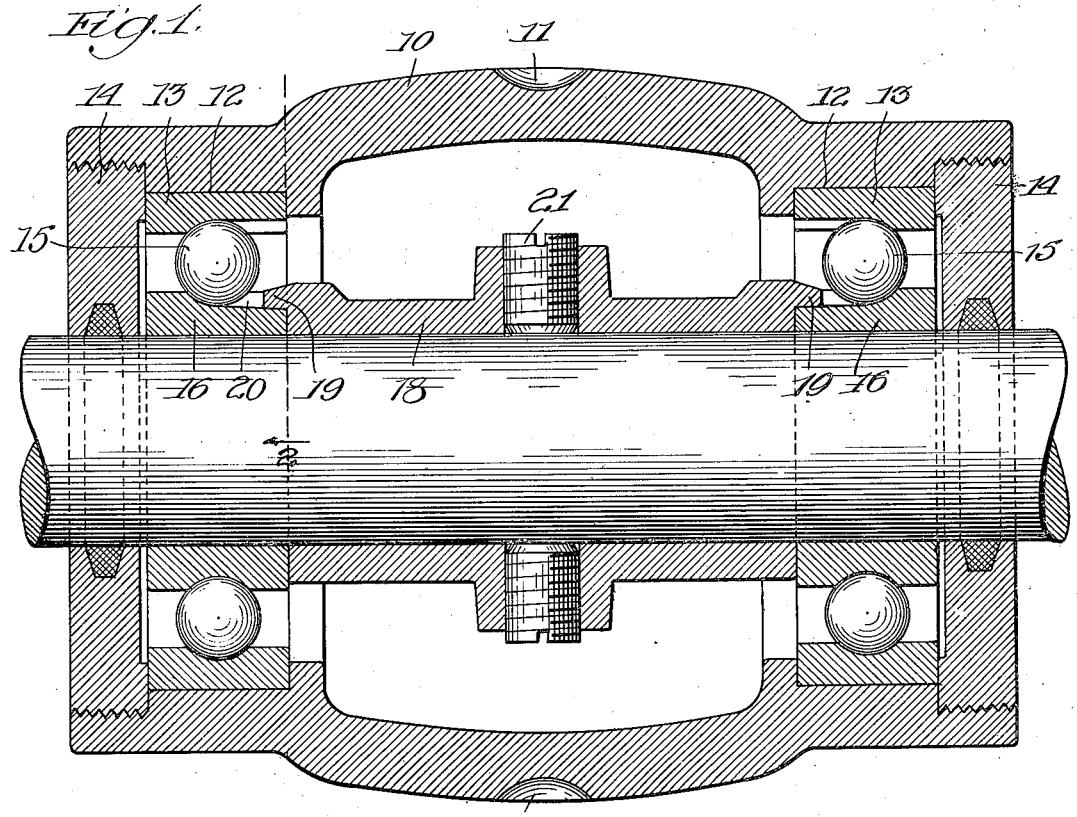
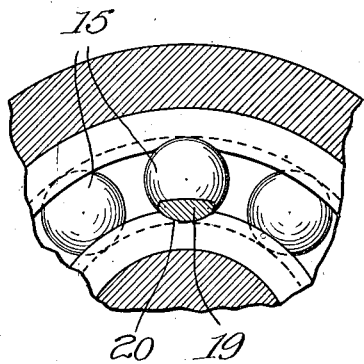
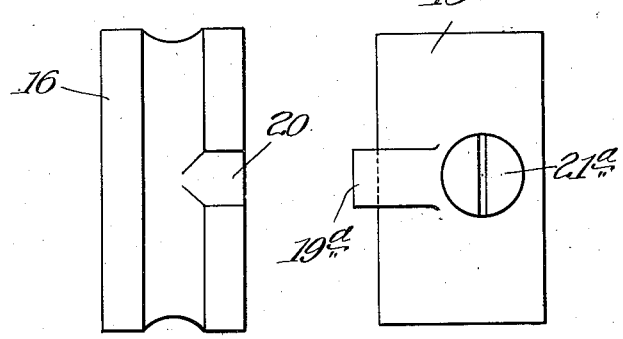
Inventor:
John Dlesk, Jr., Patented Oct. 28, 1924.

1,513,375

UNITED STATES PATENT OFFICE.

JOHN DLESK, JR., OF CHICAGO, ILLINOIS, ASSIGNOR TO STROM BALL BEARING MANUFACTURING COMPANY, OF CHICAGO, ILLINOIS, A CORPORATION OF ILLINOIS.

BALL BEARING.

Application filed June 23, 1924. Serial No. 721,792.

*To all whom it may concern:*

Be it known that I, JOHN DLESK, Jr., a citizen of the United States, residing at Chicago, in the county of Cook and State of Illinois, have invented a new and useful Improvement in Ball Bearings, of which the following is a specification.

This invention relates to ball bearings and particularly to their application to hanger boxes for use on line shafting wherein it is necessary to provide some means for preventing the inner race-members from turning on the shaft to prevent undue wear of the shaft at this point.

The primary object of this invention is to provide such a means for holding these standard inner raceways without drilling, notching or otherwise changing them.

This and other objects are accomplished by this invention which is fully described in the following specification and shown in the accompanying drawings, in which:

Figure 1 is a longitudinal section through a hanger box embodying the invention;

Fig. 2 is a partial transverse section on line 2 of Fig. 1;

Fig. 3 is a side elevation of the inner raceway of one of the ball bearings; and Fig. 4 is a similar view of a modified form of collar for use at each end of the hanger box.

The embodiment illustrated comprises a housing 10 which has oppositely disposed depressions 11 adapted to receive oppositely disposed screws of a well known hanger, not shown. At each end of the housing is a bore 12 adapted to receive the outer race-member 13 of a ball bearing which is retained therein by means of an end plate 14 which is screwed into the housing. The ball bearing comprises a set of balls 15 between the outer race-member 13 and inner race-member 16, the latter being mounted upon a shaft 17 which is usually of cold rolled steel and which therefore does not tightly fit the inner race-member.

Owing to this play between the inner race-member and the shaft, the relatively softer shaft will wear in time due to the movement between the two unless some means is provided to prevent it.

For this purpose I have provided a collar 18 which preferably extends substantially the distance between the inner race-member 16 and which has lugs 19 which extend into filling slots 20 in the inner race-members. The collar 18 is prevented from turning on the shaft by means of set-screws 21. Thus, it will be seen that the inner race-members are secured to the shaft without in any way altering them, utilizing as I do the filling slots for this purpose and these are already a part of the bearings used in this instance.

If desired a collar $18^a$ may be used as shown in Fig. 4 which is short and which has but a single lug $19^a$ for securing one of the race-members, a similar collar being provided for the bearing at the opposite end of the hanger box. This collar is secured to the shaft by means of a screw $21^a$.

While I have shown and described two embodiments of this invention, it is to be understood that it is capable of many modifications. Changes therefore in the construction and arrangement may be made which do not depart from the spirit and scope of the invention as disclosed in the appended claims.

I claim:

1. In combination, a ball bearing comprising inner and outer race-members and balls therebetween, said inner race-member having a filling slot, a housing surrounding the outer race-member, a shaft in the inner race-member, a collar secured to said shaft and having a lug extending into the filling slot of the inner race-member to prevent it from turning on the shaft.

2. In combination, a housing, a ball bearing secured in each end of the housing, said ball bearing comprising inner and outer race-members and balls between said race-members, said inner race-members having inwardly facing filling slots, a shaft passing through said inner race-member, and a collar secured to said shaft and having lugs extending into said filling slots for preventing said inner race-members from turning.

JOHN DLESK, JR.